Aug. 25, 1964    A. L. RADCLIFF    3,145,642
MULTI-LOUVER GRILL
Filed June 8, 1960    2 Sheets-Sheet 1

INVENTOR.
ALAN L. RADCLIFF
BY Arthur H. Seidel
ATTORNEY.

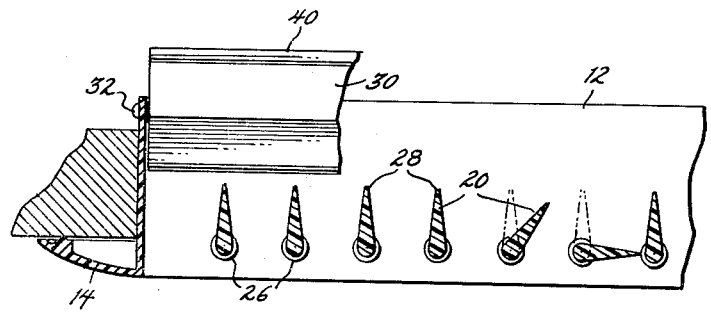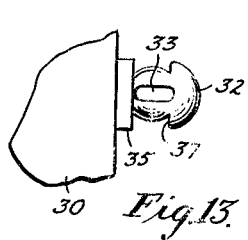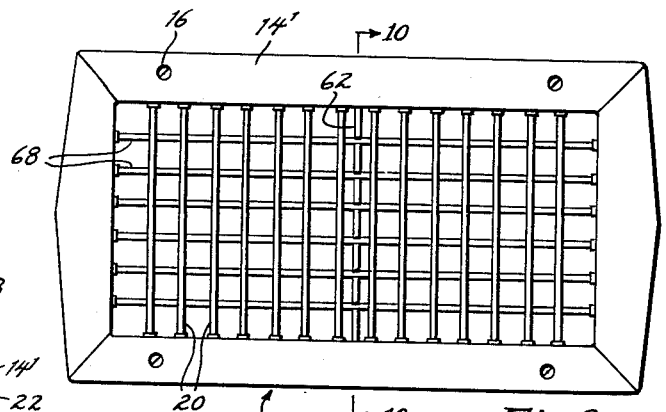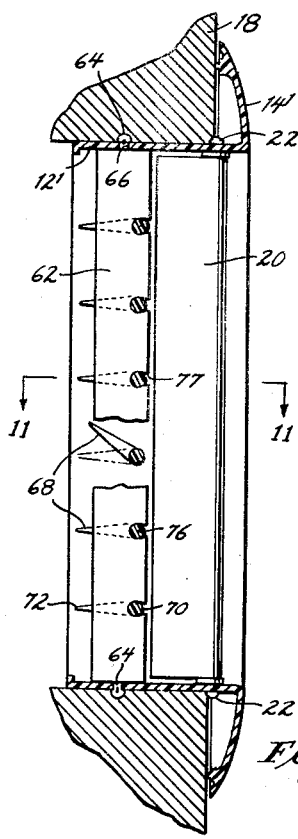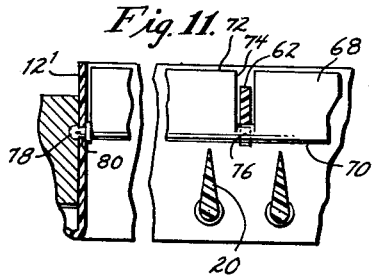

United States Patent Office 3,145,642
Patented Aug. 25, 1964

3,145,642
MULTI-LOUVER GRILL
Alan L. Radcliff, % Air Guide Plastics Corp.,
20 SE. 3rd Ave., Miami 32, Fla.
Filed June 8, 1960, Ser. No. 34,822
6 Claims. (Cl. 98—40)

This invention relates to a multi-louver register and/or grille.

Grilles of the louver type, used heretofore, have not proved to be entirely satisfactory. There is a need for a multi-louver grille which provides for double deflection of air and increased air delivery by having friction-free surfaces. I have discovered that louvers made from nylon are unbreakable, non-corrosive, heat resistant up to 300°, and increase air delivery because of a smooth friction-free surface. In order for the louvers to have "sound barrier" characteristics and in order to reduce whistling or roaring to a minimum, the louvers are constructed with an air-foil design.

It is an object of this invention to provide a novel multi-louver register and/or grille.

It is another object of this invention to provide a novel multi-louver register and/or grille having double deflection of air passing therethrough.

It is another object of this invention to provide a novel diffuser apparatus having selectively operable vertical and horizontal louvers.

It is another object of this invention to provide a novel diffuser apparatus wherein all of the elements are molded from a synthetic resin and snap together in their assembled disposition.

It is a further object of this invention to provide a novel multi-louver register having selectively adjustable vertical louvers and horizontal louvers which are selectively adjustable as a unit.

Other objects will appear hereinafter.

For the purpose of illustrating the invention there is shown in the drawings forms which are presently preferred; it being understood, however, that this invention is not limited to the precise arrangements and instrumentalities shown.

FIGURE 8 is a partial cross-sectional view taken along the lines 8—8 in FIGURE 1.

FIGURE 9 is an elevational view of another embodiment of the present invention.

FIGURE 10 is a cross-sectional view taken along the lines 10—10 in FIGURE 9.

FIGURE 11 is a cross-sectional view taken along the lines 11—11 in FIGURE 10.

FIGURE 12 is a partial cross-sectional view taken through a flange in the embodiment shown in FIGURE 9 adjacent to a mounting screw.

FIGURE 13 is an enlarged detail view of one end of a louver.

Figure 1:
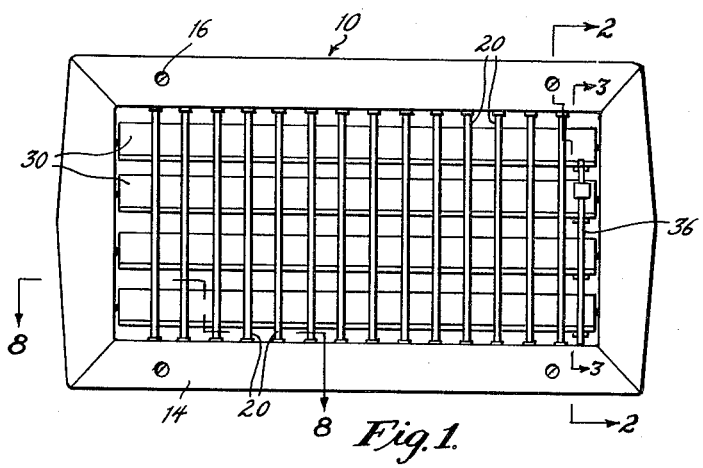
FIGURE 1 is a front elevational view of a preferred embodiment of the present invention.

Referring to the drawing in detail, wherein like numerals indicate like elements, there is shown a multi-louver register designated generally by the numeral 10.

The multi-louver register 10 comprises a generally rectangular body 12 having an outwardly directed flange 14 at one end thereof. The flange 14 is provided with a plurality of holes so that screws 16 may fixedly secure the flange 14 to a vertical wall 18.

The rectangular body 12 is provided with a plurality of selectively operable louvers 20. The louvers 20 are substantially upright and are provided with integral studs 22 at each end. The top and bottom walls of the body 12 are provided with a plurality of spaced holes 24. The studs 22 on the ends of the upright louvers 20 are snap-fitted into the holes 24. Each of the upright louvers 20 are individually movable so as to vary the flow pattern of air flowing through the multi-louver register 10. Each of the louvers 20 have an air-foil design including a rounded portion 26 and sides which taper to a point 28. The louvers 20 are disposed in a row adjacent the flange 14 with the rounded portion 26 adjacent the front face of the multi-louver register 10. Thus, each of the upright louvers 20 pivot about a vertical axis.

Figure 4:
FIGURE 4 is a cross-sectional view taken along the lines 4—4 in FIGURE 2.

A plurality of horizontally disposed louvers 30 is provided behind the upright louvers 20. The horizontally disposed louvers 30 are provided with integral studs 32 at their ends which are snap-fitted into holes 34 on the side walls of the body 12. The cooperation between the stud 32 and the hole 34 is seen more clearly in FIGURES 4 and 13. It will be noted that FIGURE 4 has been rotated ninety degrees clockwise with relation to the disposition of the arrows 4—4 in FIGURE 2. In order to make the studs 32 more flexible, the studs 32 are preferably provided with a radical elongated hole 33 in the subtantially spherical shaped body portion extending between the collar 35 and the shoulder 37 on the substantially hemispherical snap-in head. The collar 35 abuts one side of the wall of the body 12, the shoulder 37 abuts the other side, and the body portion extends through the hole 34. The tension due to the deformation of the body portion and the abutment of the shoulder 37 with the wall of body 12 retain the body 12 and louvers in snap-fitted assembled disposition.

The horizontally disposed louvers 30 are simultaneously moved by a connector arm 36. The connector arm 36 is provided with an offset tab 38 for digital manipulation of the connector arm 36. Each of the horizontally disposed louvers 30 have their greatest thickness at a central portion thereof. The horizontally disposed louvers 30 taper away from their central portion and are provided with a substantially cylindrical tip 40. As shown more clearly in FIGURE 4, each of the horizontally disposed louvers 30 are provided with a slot 42 adjacent the right hand end of the louvers. Each of the horizontally disposed louvers 30 are provided with depending flanges 44 on each side of the slot 42. A connecting arm 46 extends between the depending flanges 44 and is circular in cross-section.

Figures 2, 3:
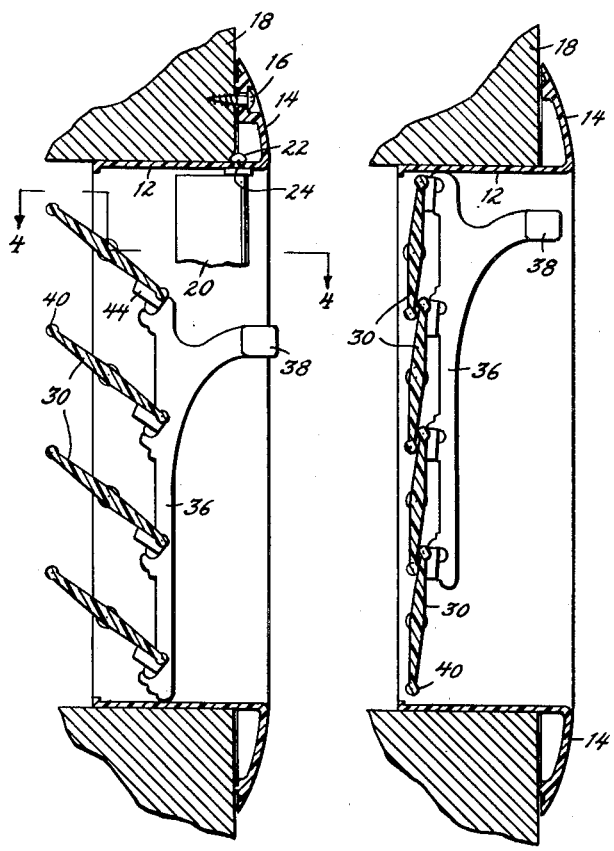
FIGURE 2 is a cross-sectional view taken along the lines 2—2 in FIGURE 1.
FIGURE 3 is a cross-sectional view taken along the lines 3—3 in FIGURE 1, with the horizontal louvers in their closed disposition.
Figure 5:
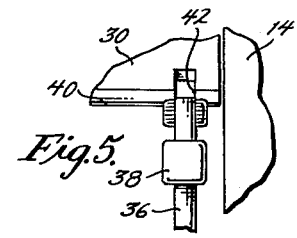
FIGURE 5 is an enlarged plan view showing details of the right hand end of the horizontal louvers in FIGURE 1.
Figure 6:
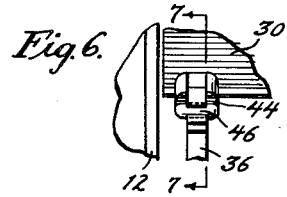
FIGURE 6 is a rear elevational view of the structure shown in FIGURE 5.
Figure 7:
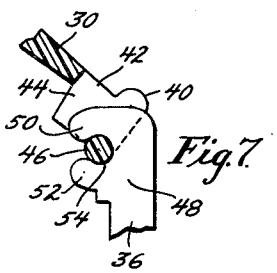
FIGURE 7 is a partial sectional view taken along the lines 7—7 in FIGURE 6.

The connector arm 36 is provided with a plurality of spaced jaws 48. As seen more clearly in FIGURE 7, the uppermost jaw 48 comprises a pair of flexible fingers 50 and 52. The fingers 50 and 52 releasably grip the connecting arm 46 by snapping the connector arm 46 into a socket 54. Since each of the jaws 48 on the connector arm releasably grip each of the connecting arms 46 on the horizontally disposed louvers 30, the horizontally disposed louvers pivot about a horizontal axis by upward and downward movement of the tab 38. Tab 38 is shown in FIGURE 3 in its uppermost position and in FIGURE 2 in its lowermost position. Since the tab 38 is positioned between an upright louver 20 and the side wall of the body 12, movement of the tab 38 does not interfere with any of the upright louvers 20.

The multi-louver register 10 is used in the following manner:

The multi-louver register 10 is affixed to a wall or the like 18 about an opening by screws 16. The screws 16 are preferably plated so as to be non-corrosive. If it is desired to have a straight horizontal stream of air, the upright louvers 20 are digitally positioned in parallel planes which are parallel to the side walls of the body 12 as shown in FIGURE 1. Also, the tab 38 is positioned intermediate its lowermost and uppermost positions so that the louvers 30 are horizontally disposed. When the louvers 20 and 30 are in this position, a stream of air will flow through the multi-louver register 10 in a horizontal path.

If it is desired to direct the stream of air to the left or to the right, the upright louvers 20 are digitally pivoted about their upright axis so as to direct the stream of air to the left or to the right. If desired, the upright louvers 20 to the left of the center line of the multi-louver register 10 may be pivoted to the left and the upright louvers 20 to the right of said center line may be pivoted to the right. Thereby, providing streams of air directed to the left and to the right of the multi-louver register 10. If it is desired to have the stream of air directed upwardly in addition to being directed to the left or to the right of the multi-louver register 10, the tab 38 is moved upwardly towards its uppermost position. If it is desired to have a stream of air directed downwardly and to the left or right of the multi-louver register 10, the tab 38 is moved towards its lowermost position. Thus, the stream of air flowing through the multi-louver register 10 can be varied so that it may be directed upwardly, downwardly, or sidewardly. If desired, some of the upright louvers 20 may be pivoted to a position wherein they prevent the flow of air through the multi-louver register 10 as shown in FIGURE 8.

Preferably, the body 12 and the louvers 20 and 30 are made from nylon. Air delivery through the multi-louver register 10 is increased by the friction-free surface of the nylon louvers 20 and 30. Louvers 20 and 30, when made from nylon, are non-corrosive, wash easily, are light weight, and will not dent, chip or discolor. Thus, nylon has proved to be a most desirable material for the components of the multi-louver register 10. Since all of the louvers 20 and 30 are snap-fitted to the body 12, and since the arm 36 is snap-fitted to each of the horizontally disposed louvers 30, the multi-louver register 10 is easily and quickly assembled and disassembled. Rapid disassembly of the louvers 20 and 30 is necessary so that the louvers 20 and 30 may be removed for cleaning purposes.

Referring to the embodiment shown in FIGURES 9 through 12, there is shown a multi-louver grille 60 which is similar to the multi-louver register 10. The body 12' of the multi-louver grille 60 is identical with the body 12 shown in FIGURES 1 through 8 except for the provision of holes 66. One hole 66 is provided at the central portion of the top wall of the body 12' and a second hole 66 is provided in the bottom wall of the body 12'. The holes 66 are directly above one another and receive studs 64, identical with studs 32, which are integral with a center support post 62.

The center support post or mullion 62 is centrally disposed intermediate the side walls of the body 12' and is a support for horizontally disposed louvers 68. The horizontally disposed louvers 68 have essentially the same contour as the upright louvers 20. Thus, the horizontally disposed louvers 68 are provided with a curved portion 70 and sides which taper to a point 72. Each of the horizontally disposed louvers 68 are provided with a slot 74 intermediate the ends of said louvers 68. The slot 74 extends from the point 72 toward the curved edge portion 70 thereby defining an arm 76. The arms 76 on the horizontally disposed louvers 68 are snap-fitted into jaws 77 spaced along the length of the center support post 62. Each of the horizontally disposed louvers 68 are provided with integral studs 78, identical with studs 32, which snap through holes 80 in the side walls of the body 12'.

As shown more clearly in FIGURE 12, the flange 14' is identical with the flange 14 on the multi-louver register 10. Each of the flanges 14 and 14' are preferably provided with an integral ridge 82. When the multi-louver register 10 and grille 60 are mounted against a wall 18, the ridges 82 will be deformed so as to provide a positive seal thereby eliminating the necessity for a gasket.

The multi-louver grille 60 is utilized in the same manner as the multi-louver register 10. Each of the horizontally disposed louvers 68 in the multi-louver grille 60 are digitally pivotable about a horizontal axis. Thus, both the upright louvers 20 and the horizontally disposed louvers 68 are digitally manipulated to vary the direction of a stream of air flowing through the multi-louver grille 60. Therefore, the multi-louver grille 60 is more versatile than the multi-louver register 10 because individual digital manipulation of the horizontally disposed louvers 68 permits a greater variety of air flow patterns.

The components of the multi-louver grille 60 are preferably made from the same material as the components in the multi-louver register 10. Since the horizontally disposed louvers 68 have the same air foil structure as the upright louvers 20, the multi-louver grille 60 provides for superior noise reduction in addition to increased air delivery.

In each of the embodiments, the louvers are shorter in length than the distance between the opposed walls of the body 12 and 12'. Each of the louvers has a stud with a longitudinal slot therein. As seen more clearly in FIGURES 4 and 13, the slot 33 in stud 32 reduces the volume of the material of the stud so that it may snap in the hole 34 more easily. Since each end of each louver is snap fitted into the body of the grilles 10 and 60, each louver is supported in tension without interference with its ability to pivot relative to the body.

The center support post or mullion 62 in the multi-louver grille 60 provides additional support for the louvers 68 without interference with the pivotable movement of the louvers 68.

The multi-louver register 10 and the grille 60 are adapted to be used in heating duct outlets, windows, in air conditioners, etc. If desired, the position of the connector arm 36 may be varied so that it may be positioned in the central portion of the multi-louver register 10.

As used hereinafter, the term "snap-fitted" is to be interpreted as meaning a securement of the type involving male and female members. A male member is larger in transverse dimensions than the entrance to the female member with either the male or the female member being deformed slightly as the male member enters the female member.

After the male member has entered the female member, means are provided so that the deformed member can return to its original dimensions. For example, the head on studs 32 may be considered a male member and the holes 34 the female member; or the arm 46 may be considered the male member and the fingers 50, 52 the female member. The head on stud 32 is deformed as it enters hole 34 and returns to its normal shape as it exits from hole 34. Likewise, the fingers 50 and 52 spread apart as arm 46 passes therebetween and the fingers 50 and 52 return to their original shape when the arm 46 is disposed within the socket 54.

The present invention may be embodied in other specific forms without departing from the spirit or essential attributes thereof and, accordingly, reference should be made to the appended claims, rather than to the foregoing specification as indicating the scope of the invention.

I claim:
1. In a diffuser apparatus comprising a frame, a plurality of substantially parallel louvers rotatably supported at their ends by said frame, each louver including an aperture therein, an arm extending across each aperture, a connector member, means coupling each louver to said member, said means including pairs of spaced fingers projecting from one edge of said member and defining jaws, each jaw embracing the arm on one of said louvers at a point spaced to one side of the axis of rotation of each respective louver, the space between the fingers of each jaw at the mouth thereof being less than the transverse dimension of said arms, and each arm being rotatably disposed within its jaw.

2. Apparatus in accordance with claim 1 wherein said member and jaws are made from polymeric material.

3. Apparatus in accordance with claim 1 wherein each arm is spaced from the plane of its louver.

4. Apparatus in accordance with claim 1 wherein one of said arms and joints is a self-lubricating material.

5. A diffuser apparatus comprising a generally rectangular body, a plurality of selectively movable upright louvers pivotally mounted between upper and lower walls of said body, a plurality of selectively movable horizontally disposed louvers mounted between side walls on said body, each louver having an integral stud in snap-fitted engagement with said walls, said body and said louvers being made from a synthetic resin, an integral mounting flange extending laterally outwardly from the periphery of said body, said stud including a head having shoulders, a body portion extending between the shoulders and the louvers, said head having larger transverse dimensions than said body portion, and an elongated hull in said body portion.

6. In a diffuser apparatus comprising a body, a pair of aligned holes in substantially parallel walls of said body, a selectively movable louver in said body, said louver having an integral stud on each end thereof, each stud including a deformable head larger in transverse cross-section than said holes, a body portion extending between each head and an end of said louver, the length of said body portion being substantially equal to the thickness of said walls, and said louver being in snap-fitted engagement with said body with each body portion extending through one of said holes, each of said body portions being larger in diameter than said apertures, and aperture means in each of said body portions reducing the cross-sectional area of each of said body portions, whereby each of said body portions may be deformed so as to extend through one of said apertures.

References Cited in the file of this patent
UNITED STATES PATENTS

| | | |
|---|---|---|
| 167,481 | Tuttle | Sept. 7, 1875 |
| 1,265,055 | Clover | May 7, 1918 |
| 1,706,338 | Workman | Mar. 19, 1929 |
| 2,282,572 | Graham | May 12, 1942 |
| 2,600,934 | Spieth | June 17, 1952 |
| 2,662,335 | Calverly | Dec. 15, 1953 |
| 2,928,332 | Goettl et al. | Mar. 15, 1960 |
| 2,991,707 | Goettl | July 11, 1961 |
| 2,996,970 | Goettl | Aug. 22, 1961 |

FOREIGN PATENTS

| | | |
|---|---|---|
| 502,994 | Canada | May 25, 1954 |
| 614,569 | Great Britain | Dec. 17, 1948 |